(12) United States Patent
Kanagala et al.

(10) Patent No.: US 7,880,616 B2
(45) Date of Patent: Feb. 1, 2011

(54) WIRELESS DATA COMMUNICATION SYSTEM HAVING RADIO FREQUENCY DEVICES, AND RELATED OPERATING METHODS FOR DISABLING A TRANSMIT MODE

(75) Inventors: Sameer Kanagala, San Jose, CA (US); Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 253 days.

(21) Appl. No.: 12/146,298

(22) Filed: Jun. 25, 2008

(65) Prior Publication Data

US 2009/0322488 A1    Dec. 31, 2009

(51) Int. Cl.
*G08B 13/14* (2006.01)
(52) U.S. Cl. ............... 340/572.1; 340/539.1; 340/10.1; 340/10.3; 340/10.33; 340/10.34
(58) Field of Classification Search ............ 340/572.1, 340/572.4, 539.1, 825.69, 10.1, 10.3, 10.33, 340/10.34; 235/375, 376, 380, 381, 487, 235/492
See application file for complete search history.

(56) References Cited

U.S. PATENT DOCUMENTS

| | | | | |
|---|---|---|---|---|
| 6,089,456 A | * | 7/2000 | Walsh et al. | 235/472.01 |
| 6,570,487 B1 | * | 5/2003 | Steeves | 340/5.2 |
| 7,536,152 B2 | * | 5/2009 | Inano et al. | 455/41.2 |
| 2008/0251640 A1 | * | 10/2008 | Johnson et al. | 244/118.1 |

\* cited by examiner

*Primary Examiner*—Hung T. Nguyen
(74) *Attorney, Agent, or Firm*—Ingrassia Fisher & Lorenz, P.C.

(57) ABSTRACT

A wireless system suitable for use as a radio frequency (RF) locationing or presence detection system includes at least one wireless access device and at least wireless device, such as an active RF tag, corresponding to an item or asset of interest. A method of managing RF transmissions by the wireless devices is provided. The method involves the wireless device receiving keep-alive beacons during a first period of time. During this first period of time, the wireless device is operated in a transmit mode. During a second period of time that follows the first period of time, the wireless device receives no keep-alive beacons. During this second period of time, the wireless device is operated in a standby mode such that RF transmissions are disabled.

12 Claims, 6 Drawing Sheets

FIG.7

WIRELESS DATA COMMUNICATION SYSTEM HAVING RADIO FREQUENCY DEVICES, AND RELATED OPERATING METHODS FOR DISABLING A TRANSMIT MODE

TECHNICAL FIELD

Embodiments of the subject matter described herein relate generally to wireless data communication systems. More particularly, embodiments of the subject matter relate to systems having one or more active radio frequency (RF) tags or wireless devices that wirelessly communicate with one or more wireless access devices.

BACKGROUND

RF identification (RFID) systems are well known and the prior art includes different types of RFID systems, different applications for RFID systems, and different data communication protocols for RFID systems. RFID systems are commonly utilized for product tracking, product identification, and inventory control in manufacturing, warehouse, transportation, and retail environments. One type of RFID system includes two primary components: a reader (also known as an interrogator); and a passive tag (also known as a transponder). The tag is a miniature device that is capable of responding, via an air channel, to an RF signal generated by the reader. The tag is configured to generate a reflected RF signal in response to the RF signal emitted from the reader. The reflected RF signal is modulated in a manner that conveys identification data back to the reader. The identification data can then be stored, processed, displayed, or transmitted by the reader as needed.

Another type of RFID system employs active RF tags configured to wirelessly communicate with a reader or wireless access device. In this type of system, an active RF tag includes an integrated power supply, such as a battery, a processor, memory, and an RF radio. The active RF tag periodically broadcasts (chirps) RF signals in an attempt to reach a nearby reader or wireless access device, where the RF signals convey data associated with the respective tag, which in turn is associated with a particular asset, package, item, or product. In practice, an active RF tag may function as a wireless client in a wireless data communication system, such as a wireless local area network (WLAN). In such an environment, the active RF tag can wirelessly communicate with one or more wireless access devices, which may be standalone wireless access points or wireless access ports that cooperate with one or more wireless switches located in the WLAN.

Due to their relatively high cost, active RF tags are typically used for tracking and/or locating relatively high valued assets, containers, packages, or items. For such applications, each active RF tag may be assigned a network identifier or address (such as a MAC address), which in turn is associated with a particular asset; the active RF tag is attached to, contained within, or integrated with the asset to enable tracking and locating. A network of wireless access devices in a tracking environment can be used to receive and process the RF signals emitted by the active RF tags. For example, if at least three access devices receive RF signals from one active RF tag, then triangulation techniques and received signal strength measurements can be used to pinpoint the physical location of the active RF tag and, therefore, the associated asset.

Product supply chains often require shipment of assets, containers, and packages on aircraft. Although it may be desirable to track active RF tags as they are loaded on (and unloaded from) an aircraft, aviation rules and regulations may prohibit the transmission of RF signals during takeoff, flight, and landing. Moreover, after an item tagged with an active RF tag has been loaded onto an aircraft for transport, constant monitoring of its location may not be a priority because the item will be inherently constrained within the cargo area of the aircraft. Accordingly, active RF tags should be turned off, powered down, or disabled during certain times while in transit onboard an aircraft. Unfortunately, currently available active RF tags are designed to automatically and continuously transmit (chirp) RF signals until their batteries die. In order to temporarily disable the RF transmit capability of a conventional active RF tag, one would need to remove its battery. Thus, it is impractical to temporarily disable conventional active RF tags onboard an aircraft to address aviation safety regulations.

As mentioned above, active RF tags and other portable wireless devices may rely on battery power. Conventional active RF tags continuously chirp (transmit) until their batteries die. Such continuous chirping wastes battery power in certain situations where transmissions are unnecessary (e.g., overnight or during other idle periods, when the tagged assets are safely stored in a warehouse and are stationary for a known period of time, etc.). Thus, a need exists for a simple and effective technique that can be used to temporarily disable the transmit capability of active RF tags and other wireless devices, which can extend battery life.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Figure 1:
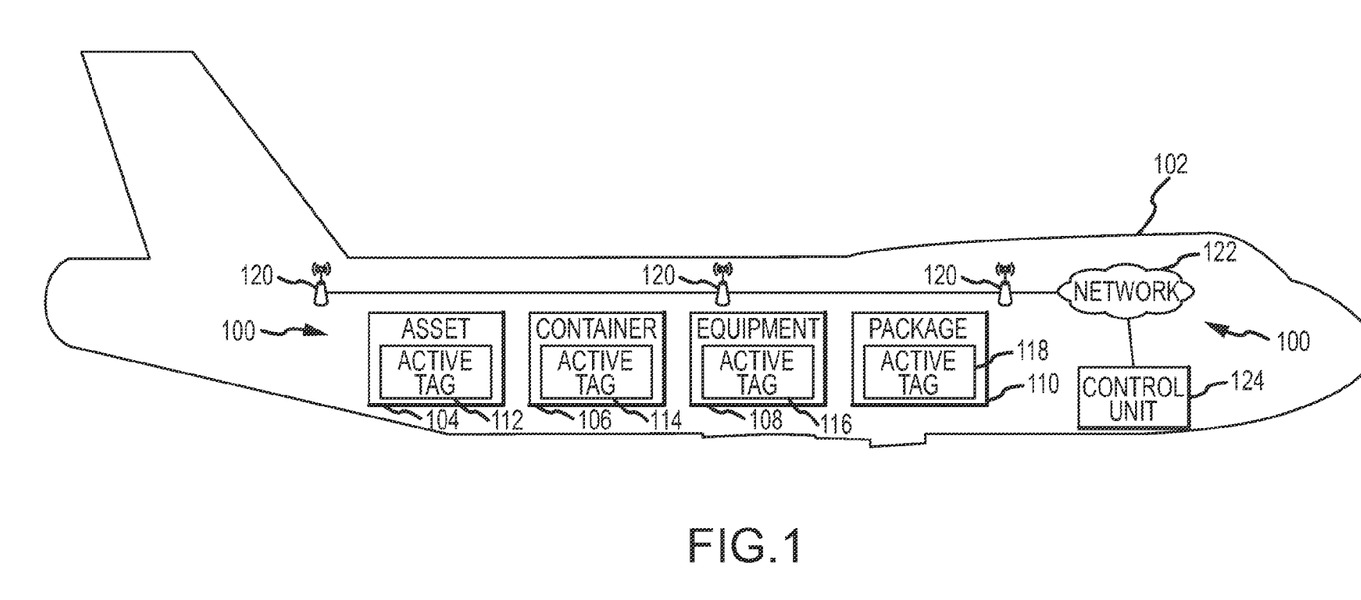
FIG. 1 is a schematic representation of an embodiment of a wireless data communication system onboard an aircraft.

FIG. 1 is a schematic representation of an embodiment of a wireless data communication system 100 onboard an aircraft 102. Although an aircraft deployment is described herein, alternate embodiments of system 100 may be utilized in other environments and for other applications where it might be desirable to temporarily disable the RF transmit capability of wireless devices. This particular embodiment of system 100 is suitably configured to interact with wireless devices (e.g., active RF tags) associated with various items of interest, which may include, without limitation: at least one asset 104; at least one container 106; at least one piece of equipment 108; and/or at least one package 110. For the sake of brevity, conventional techniques related to RFID systems, active RF tags, and other functional aspects of the systems (and the individual operating components of the systems) may not be described in detail herein.

Although not a requirement, system 100 uses one active RF tag per item of interest. Accordingly, asset 104 has an associated active RF tag 112, container 106 has an associated active RF tag 114, equipment 108 has an associated active RF tag 116, and package 110 has an associated active RF tag 118. Each active RF tag in system 100 may be affixed to, enclosed within, packaged with, integrated into, or otherwise maintained in close physical proximity to its corresponding item of interest. The physical packaging and form factor of active RF tags used with system 100 may vary according to the particular deployment, item type, supplier, and/or manufacturer. Indeed, the overall shape, size, hardware, and packaging characteristics of active RF tags used with system 100 may be similar to conventional active RF tags available from manufacturers such as AeroScout, Ekahau, and Newbury Networks.

The illustrated embodiment of wireless data communication system 100 includes, without limitation: one or more wireless access devices 120; a network architecture 122; and an aircraft control unit 124. For the sake of brevity, conventional techniques related to WLANs, wireless access devices, wireless data communication, and network control may not be described in detail herein. In practice, wireless access devices 120 and aircraft control unit 124 are all coupled to network architecture 122 to facilitate the exchange of information. FIG. 1 depicts an implementation where wireless access devices 120 are all onboard aircraft devices. In other deployments, system 100 can cooperate with one or more wireless access devices (not shown) that are not located on aircraft 102, for example, wireless access devices located at the aircraft terminal, wireless access devices located near the cargo area, handheld wireless access devices, or the like.

In certain embodiments, a wireless access device can be realized as a wireless access port, which is a "thin" device that relies on the network intelligence and management functions provided by a wireless switch in network architecture 122. In other embodiments, a wireless access device can be realized as a wireless access point, which is a "thick" device having the network intelligence and processing power integrated therein. Thus, a wireless access point need not rely upon a wireless switch for operation. Wireless access ports having conventional features that can be incorporated into wireless access devices 120, and wireless access points having conventional features that can be incorporated into wireless access devices 120, are available from Motorola, Inc. Briefly, a wireless access device 120 as described herein is suitably configured to transmit and receive data from wireless clients (including active RF tags) over wireless links. Once that data is captured by the wireless access device 120, the data can be processed for communication within network architecture 122 and/or for handling by the host aircraft 102. For example, the data can be encapsulated into a packet format compliant with a suitable data communication protocol.

As described in more detail herein, a wireless access device 120 is suitably configured to transmit enable messages (e.g., keep-alive beacons) to the active RF tags to support operation of system 100 in a transmit mode. If an active RF tag in system 100 stops receiving enable messages, then that active RF tag will switch to a standby mode during which it will disable RF transmissions. In certain embodiments, wireless access devices 120 are powered down to activate the standby mode. Powering down wireless access devices 120 is one simple measure that can be taken to ensure that the enable messages are no longer broadcast throughout wireless data communication system 100. In other words, powering down wireless access devices 120 causes the active RF tags to stop transmitting RF signals. For the exemplary embodiment described here, aircraft control unit 124 is suitably configured to initiate powering down of one or more wireless access devices 120 (preferably, all of them) for the standby mode. In this regard, aircraft control unit 124 may include, communicate with, or incorporate processing logic, command logic, and/or control logic associated with one or more other subsystems of aircraft 102. For example, aircraft control unit 124 may cooperate with a user interface feature accessible to a member of the flight crew, a member of the ground crew, an air traffic controller, or the like, where the user interface feature can be manipulated to switch between the transmit and standby modes. As another example, aircraft control unit 124 may cooperate with an electronic control unit or flight instrument of aircraft 102 such that system 100 switches between the transmit and standby modes automatically in response to certain criteria (e.g., airspeed, groundspeed, altitude, GPS location, time, etc.).

Figure 2:
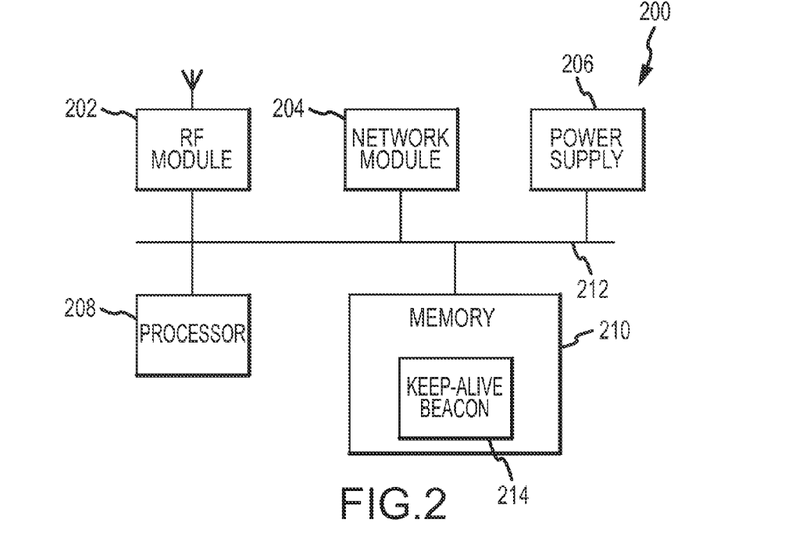
FIG. 2 is a schematic representation of an embodiment of a wireless access device suitable for use in the system shown in FIG. 1.

FIG. 2 is a schematic representation of an embodiment of a wireless access device 200 suitable for use in the system shown in FIG. 1. Wireless access device 200 generally includes, without limitation: an RF module 202; a network module 204; a power supply 206; a processor 208; and an appropriate amount of memory 210. These and other elements of wireless access device 200 may be interconnected together using a bus 212 or any suitable interconnection arrangement. Such interconnection facilitates communication between the various elements of wireless access device 200. A practical embodiment of wireless access device 200 will include additional components and elements configured to support known or conventional operating features that need not be described in detail herein.

RF module 202, which includes a receiver and a transmitter (or a transceiver), is configured to communicate with wireless clients, including active RF tags, via a wireless data communication link. RF module 202 may cooperate with a suitably configured RF antenna arrangement to support the particular wireless communication protocol. In exemplary embodiments, RF module 202 is configured to support WLAN connectivity in compliance with established IEEE Standards, such as 802.11 (any suitable variant). Of course, RF module 202 may be configured to support alternate or additional wireless data communication protocols, including future variations of 802.11. In yet other embodiments, RF module 202 could be configured to support other wireless data communication schemes such as BLUETOOTH®; ZigBee (and other variants of the IEEE 802.15 protocol); IEEE 802.16 (WiMAX or any other variation); Direct Sequence Spread Spectrum; Frequency Hopping Spread Spectrum; cellular/wireless/cordless telecommunication protocols; paging network protocols; wireless hospital or health care facility network protocols such as those operating in the WMTS bands; GPRS; and proprietary wireless data communication protocols such as variants of Wireless USB.

Network module 204 generally represents the hardware, software, firmware, processing logic, and/or other components of wireless access device 200 that enable bi-directional communication between wireless access device 200 and network components to which wireless access device 200 is connected. For example, network module 204 may be configured to support 10/100/1000 Mbps Ethernet LAN traffic. Referring to FIG. 1 as an example, network module 204 is suitably configured to transmit data to components in network architecture 122, and to receive data from components in network architecture 122, such as aircraft control unit 124. In a typical deployment, network module 204 provides an Ethernet interface such that wireless access device 200 can communicate with a conventional Ethernet-based network. In this regard, network module 204 may include a physical interface, such as 10/100/1000 Mbps, for connection to the network, and network module 204 (and/or processor 208) may handle Ethernet addressing for data packets sent from wireless access device 200.

Power supply 206 is configured to provide operating power to wireless access device 200. In some embodiments, power supply 206 may be realized as a disposable or rechargeable battery or battery pack. In other embodiments, power supply 206 may include a voltage regulator and/or converter that allows wireless access device 200 to receive operating power from another source, such as a source onboard an aircraft, or from the network architecture itself. For example, power supply 206 may be suitably configured to receive engine-generated power, backup DC power, power obtained from an auxiliary power unit, or the like. In some embodiments, power supply 206 can employ Power over Ethernet (PoE) techniques compliant with IEEE Specification 802.3af. Notably, power supply 206 can be regulated and controlled as described herein to switch between a transmit mode and a standby mode. More specifically, for the standby mode, power supply 206 does not provide sufficient operating power for wireless access device 200, resulting in a shutdown or power down condition. In contrast, for the transmit mode, power supply 206 provides normal operating power for wireless access device 200, resulting in a powered or normal condition.

Processor 208 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor 208 preferably includes processing logic that is configured to carry out the functions, techniques, and processing tasks associated with the operation of wireless access device 200. For example, processor 208 can control the transmission of enable messages, keep-alive beacons, and other RF signals by RF module 202.

Memory 210 may be implemented or realized with RAM memory, flash memory, ROM memory, EPROM memory, EEPROM memory, registers, a hard disk, a removable disk, a CD-ROM, or any other form of storage medium known in the art. In addition, memory 210 includes sufficient data storage capacity to support the operation of wireless access device 200. Memory 210 can be coupled to processor 208 such that processor 208 can read information from, and write information to, memory 210. In the alternative, memory 210 may be integral to processor 208. As an example, processor 208 and memory 210 may reside in a suitably configured ASIC.

Memory 210 may be used to store information related to the content, configuration, and/or format of a keep-alive beacon 214 for wireless access device 200. In typical applications, keep-alive beacon 214 will be suitably arranged in accordance with an accepted format that is recognizable by the active RF tags with which wireless access device 200 communicates. In practice, keep-alive beacon 214 may be formatted for transmission as one or more frames that are compatible with the particular wireless communication system. Upon receipt by an active RF tag, keep-alive beacon 214 (or the content thereof) causes the active RF tag to enter or maintain the transmit mode such that the active RF tag can begin or continue to transmit RF signals. It should be appreciated that keep-alive beacon 214 may represent a distinct type of beacon in the wireless data communication system, or a modified version of an existing type of beacon that is used for other purposes. In other words, keep-alive beacon 214 or the information conveyed in keep-alive beacon 214 may actually be "piggybacked" with another beacon or frame.

Figure 3:
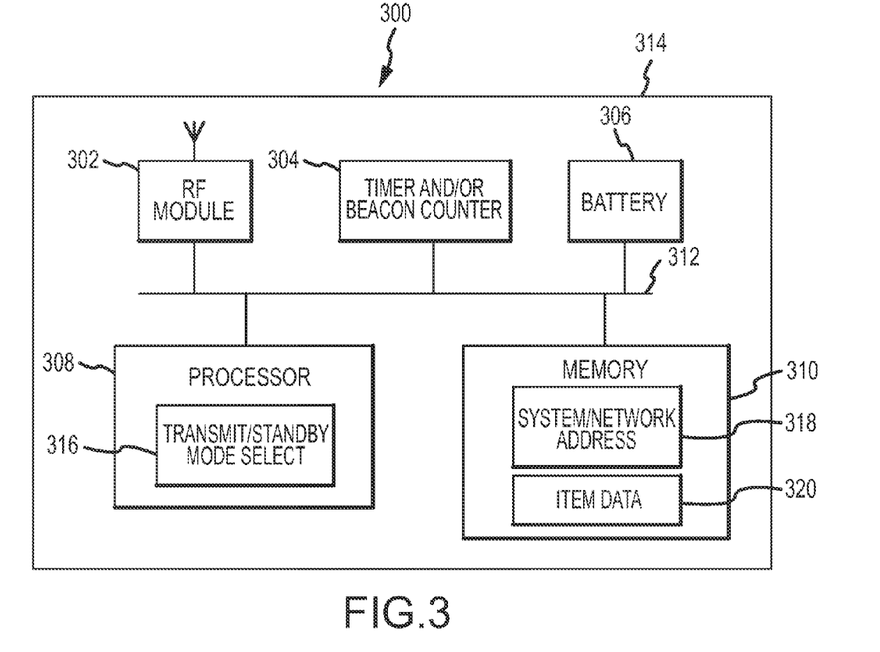
FIG. 3 is a schematic representation of an embodiment of an RF device suitable for use in the system shown in FIG. 1.

FIG. 3 is a schematic representation of an embodiment of a wireless RF device 300 suitable for use in the system shown in FIG. 1. Although RF device 300 may be implemented in various form factors (e.g., an RFID tag, a wireless mobile device, an asset tag, a Wi-Fi enabled device), the following description refers to an embodiment where RF device 300 is an active RF tag. RF device 300 is suitably configured to support operation of the wireless data communication system in the transmit mode for as long as it receives enable messages (e.g., keep-alive beacons) from any of the wireless access devices in the system. RF device 300 is also configured to support operation of the system in a standby mode if it no longer receives any enable messages (e.g., keep-alive beacons).

RF device 300 generally includes, without limitation: an RF module 302; a timer and/or beacon counter 304; an internal power supply such as a battery 306; a processor 308; and an appropriate amount of memory 310. These and other elements of RF device 300 may be interconnected together using a bus 312 or any suitable interconnection arrangement. Such interconnection facilitates communication between the various elements of RF device 300. In practice, RF device 300 may be implemented as a system on a chip (SoC), i.e., realized using one integrated circuit chip. A practical embodiment of RF device 300 will include additional components and elements configured to support known or conventional operating features that need not be described in detail herein. RF device 300 will typically be realized as a self-contained component having a package housing 314 that encloses the elements mentioned above. Package housing 314 is relatively compact in size, and certain embodiments may be less than three inches long, less than two inches wide, and less than one inch thick.

RF module 302, which includes a receiver and a transmitter (or a transceiver), is configured to transmit and receive wireless signals to communicate with RFID readers, wireless access devices, or the like. RF module 302 may cooperate with a suitably configured RF antenna arrangement to support the particular wireless communication protocol. RF module 302 can be configured to support wireless connectivity using any of the techniques, protocols, and schemes mentioned above with reference to RF module 202 (see FIG. 2). In preferred embodiments, RF module 302 is compatible with IEEE Specification 802.11 (any suitable variant thereof). RF module 302 is suitably configured to receive enable messages, keep-alive beacons, and other RF signals from one or more wireless access devices within the wireless data communication system.

Timer and/or beacon counter 304 can be used to determine whether a mode switching condition exists, where the mode switching condition causes RF device 300 to switch between the transmit mode and the standby mode. In one embodiment, a timer measures a time interval that is initiated or started when an enable message is received by RF device 300. The timer keeps track of the time period between successive enable messages. Accordingly, the timer can be reset for each received enable message. In an alternate embodiment, keep-alive beacons are received by RF device 300 in designated time slots. In such an embodiment, a beacon counter can be used to detect when RF device 300 fails to receive a keep-alive beacon in a designated time slot, and maintain a count of how many successive keep-alive beacons have been missed. The significance and application of timer and/or beacon counter 304 will be explained in more detail below with reference to FIGS. 4-7.

Battery 306 is configured to provide operating power to RF device 300. A battery or a physically small battery pack is desirable due to the portable and self-contained form factor of RF device 300. Battery 306 may be realized as a disposable or rechargeable battery or battery pack. Battery 306 is suitably configured with voltage and current ratings that can support both transmit and standby modes for RF device 300. During the transmit mode, battery 306 provides sufficient operating power to drive RF module 302 when transmitting wireless signals. During the standby mode, battery 306 provides standby power to RF device 300. Even though RF transmissions are disabled in the standby mode, RF module 302 is still able to receive RF signals, enable messages, and beacons.

Processor 308 may be implemented or realized as generally described above for processor 208 (FIG. 2). Processor 308 preferably includes processing logic that is configured to carry out the functions, techniques, and processing tasks associated with the operation of RF device 300. For example, processor 308 can enable and disable wireless transmission by RF module 302 for operation in the transmit and standby modes, respectively. In addition, processor 308 can detect a mode switching condition and take appropriate action (switch operating modes) as needed. Moreover, processor 308 may be suitably configured to support encryption and/or authentication schemes, which may be implemented to prevent spoofing (where an unwanted or unauthorized device attempts to communicate with RF device 300. In this regard, FIG. 3 depicts transmit/standby mode selection logic 316 associated with processor 308.

Memory 310 may be implemented or realized with RAM memory, flash memory, ROM memory, EPROM memory, EEPROM memory, registers, a hard disk, a removable disk, a CD-ROM, or any other form of storage medium known in the art. In addition, memory 310 includes sufficient data storage capacity to support the operation of RF device 300. Memory 310 can be coupled to processor 308 such that processor 308 can read information from, and write information to, memory 310. In the alternative, memory 310 may be integral to processor 308. As an example, processor 308 and memory 310 may reside in a suitably configured ASIC.

Memory 310 may be used to store a system or network identifier or address for RF device 300. The system/network address 318 can be a MAC address, an IP address, or any identifiable sequence of bits, alphanumeric characters, or the like. Over the air provisioning may be utilized to assign an address or an identifier to RF device 300. System/network address 318 serves as a unique identifier for RF device 300, at least within the network domain of interest. In other words, in an environment having a large number of items to track, each item could be tagged with an RF device 300, each having a different system/network address associated therewith. This allows the wireless data communication system to link a given active RF device to its respective item or asset. In this regard, memory 310 might also be used to store item data 320 related to the particular item, asset, package, container, product, etc. Under certain operating conditions, RF device 300 can transmit some or all of its item data 320 to a wireless infrastructure component, such as a wireless access device.

Figure 4:
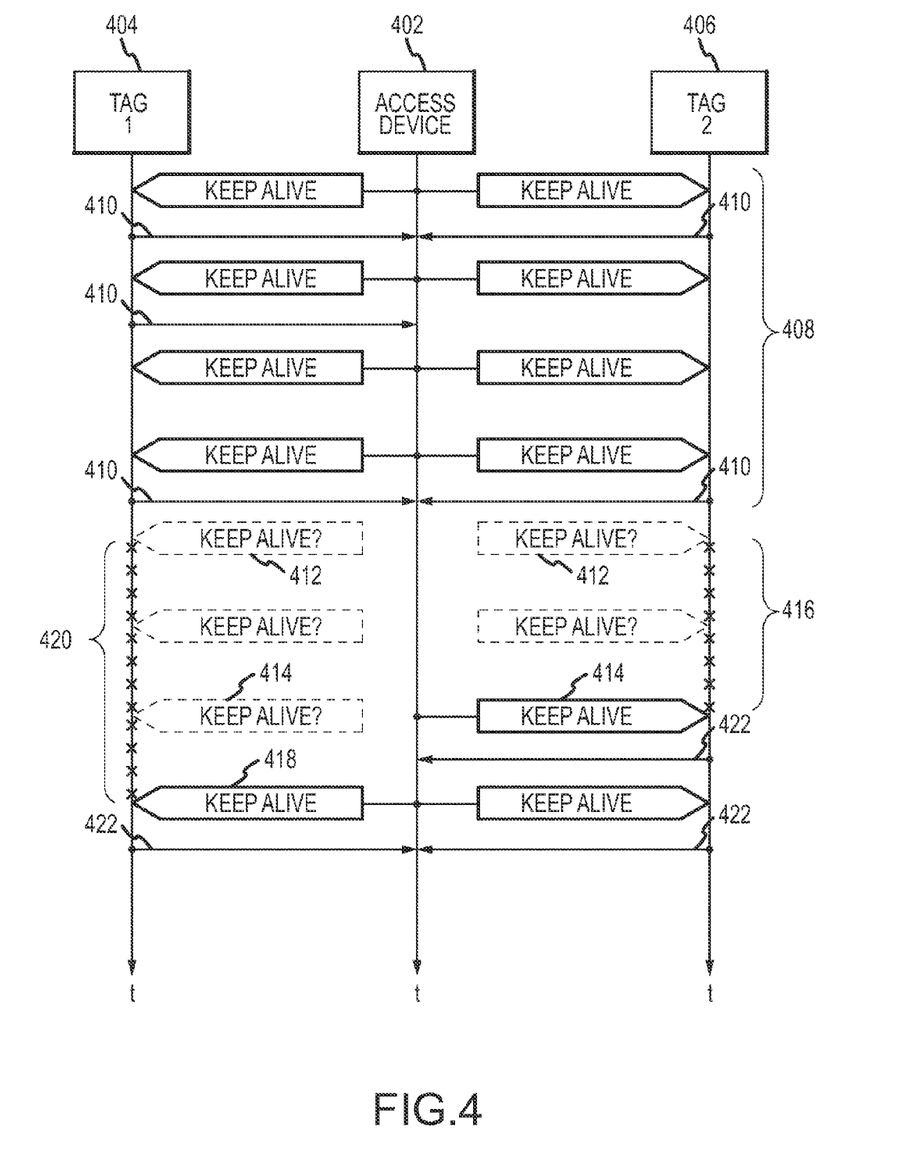
FIG. 4 is a signal flow diagram that depicts the transmission of RF signals for an exemplary embodiment.
Figure 5:
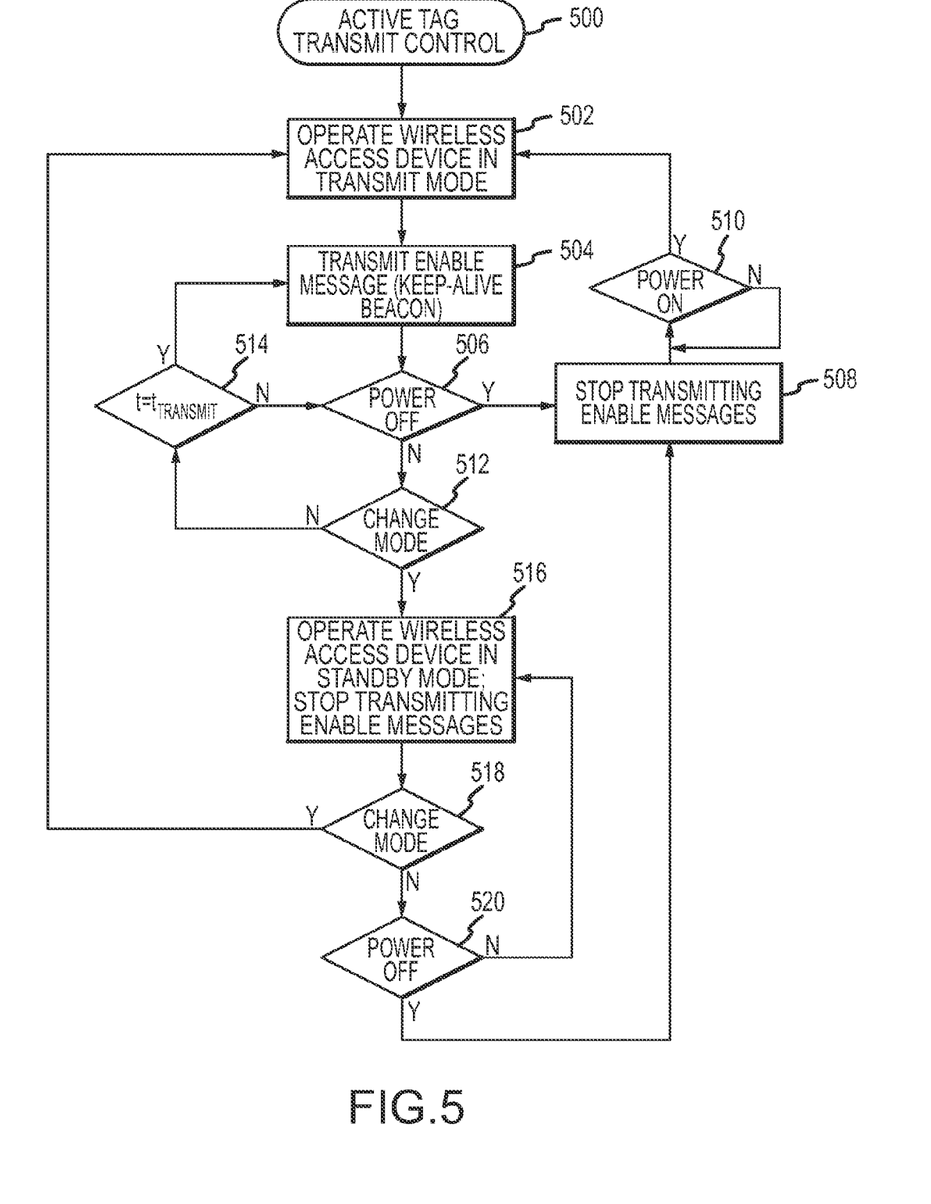
FIG. 5 is a flow chart that illustrates an embodiment of an active tag transmit control process.
Figure 6:
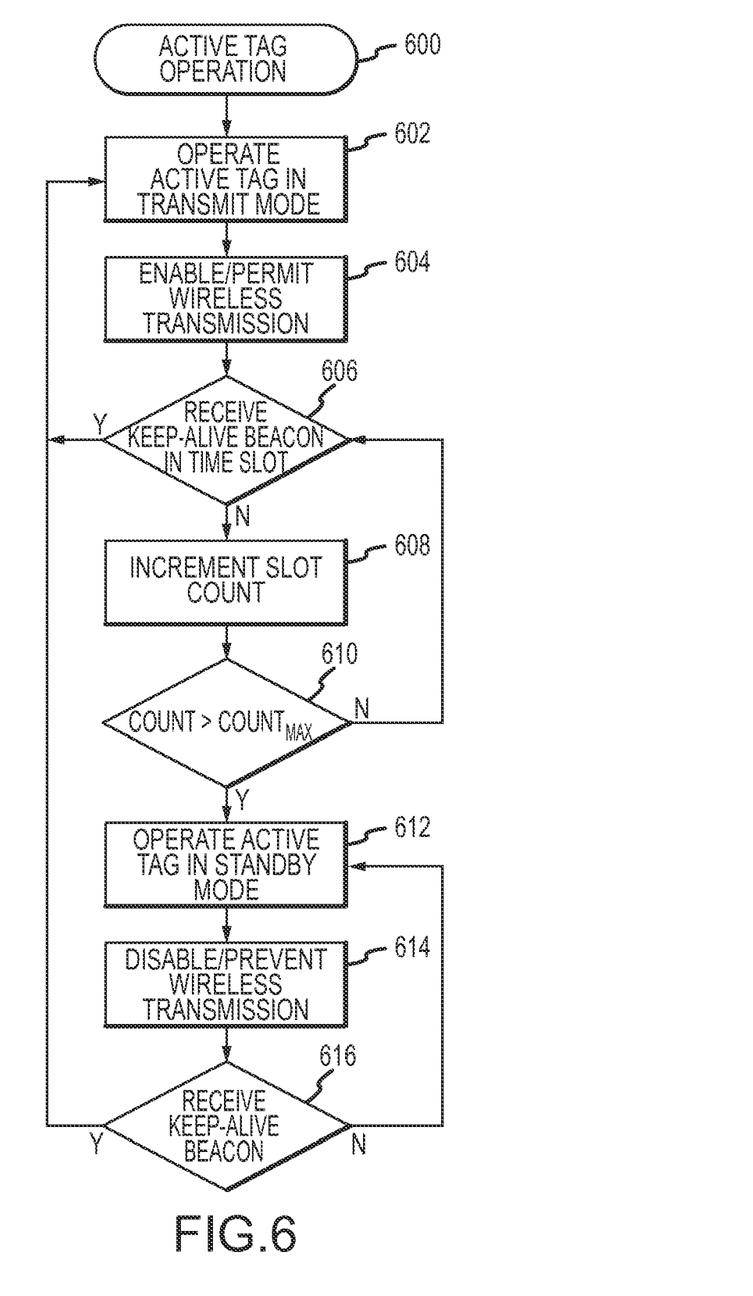
FIG. 6 is a flow chart that illustrates an embodiment of an active tag operation process.

Wireless devices, active RF tags, and wireless access devices configured as described above can be utilized to manage transmissions in the wireless system. RF transmissions from the wireless devices are enabled and disabled as needed to reduce the amount of RF energy emitted by the wireless system. The methodology described herein need not rely on any physical manipulation or adjustment of the wireless devices. Moreover, the methodology described herein utilizes centralized control to enable and disable the RF transmit capability of the wireless devices. This methodology will be explained with reference to FIGS. 4-6. FIG. 4 is a signal flow diagram that depicts the transmission of RF signals for an exemplary embodiment, FIG. 5 is a flow chart that illustrates an embodiment of an active tag transmit control process 500, and FIG. 6 is a flow chart that illustrates an embodiment of an active tag operation process 600. The various tasks performed in connection with these processes may be performed by software, hardware, firmware, or any combination thereof. For illustrative purposes, the following description of these processes may refer to elements mentioned above in connection with FIGS. 1-3. In practice, portions of a given process may be performed by different elements of the described system. It should be appreciated that a described process may include any number of additional or alternative tasks, the tasks shown in the figures need not be performed in the illustrated order, and a described process may be incorporated into a more comprehensive procedure or process having additional functionality not described in detail herein.

The signal flow diagram of FIG. 4 illustrates a simple embodiment where a wireless access device 402 communicates with a first active RF tag 404 and a second active RF tag 406. In FIG. 4, time progresses in the downward direction. A first period of time 408 represents operation in a transmit mode. During this first period of time 408, wireless access device 402 transmits enable messages in designated time slots. For this example, the enable messages are realized as keep-alive beacons. Also during this first period of time 408, first active RF tag 404 and second active RF tag 406 both receive the keep-alive beacons in their designated time slots. Moreover, during first period of time 408, either or both active RF tags 404/406 may transmit outgoing or upstream RF signals, which might be intended for receipt by wireless access device 402. FIG. 4 depicts a number of these upstream transmit signals 410.

Eventually, wireless access device 402 fails to send a keep-alive beacon in its designated time slot. This failed or missing keep-alive beacon 412 is depicted in dashed lines. For this particular example, if an active RF tag does not receive a keep-alive beacon in its designated time slot, it will switch from the transmit mode to the standby mode. As long as that active RF tag receives no keep-alive beacons, it will continue operating in the standby mode. Thereafter, once the active RF tag receives a designated number (i.e., one or more) of consecutive keep-alive beacons, it will switch back to the transmit mode. It may be desirable to receive multiple consecutive keep-alive beacons before switching back to the transmit mode, to prevent a condition where the transmit mode rapidly switches back and forth. FIG. 4 depicts a scenario where active RF tag 406 receives a keep-alive beacon 414 in the designated time slot after missing two of them. The cross-hatching on the timeline for active RF tag 406 corresponds to a time period 416 during which active RF tag 406 operates in the standby mode. Notably, during this time period 416 the RF transmit functionality of active RF tag 406 is disabled and active RF tag 406 does not transmit any RF signals.

Even though wireless access device 402 broadcasts the keep-alive beacon 414, it may not be received by all of the active RF tags in the system. FIG. 4 depicts such a scenario—active RF tag 404 does not receive keep-alive beacon 414 and, therefore, active RF tag 404 remains in the standby mode. Eventually, active RF tag 404 receives a keep-alive beacon 418 in the designated time slot after missing three of them. The crosshatching on the timeline for active RF tag 404 corresponds to a time period 420 during which active RF tag 404 operates in the standby mode. Notably, during this time period 420 the RF transmit functionality of active RF tag 404 is disabled and active RF tag 404 does not transmit any RF signals.

Once wireless access device 402 transmits a keep-alive beacon, the system assumes that upstream RF transmissions are now permitted. Accordingly, the active RF tags can switch back to the transmit mode and can begin sending upstream transmit signals 422. The bottom of FIG. 4 corresponds to the transmit mode after both active RF tags have switched back from the standby mode.

It should be noted that the system may support different wireless communication modes, such as peer-to-peer communication, mesh network communication, or the like. For example, certain embodiments may support tag-to-tag wireless communication, which could be used to relay keep-alive beacons from one tag to another tag. As another example, certain embodiments may support wireless communication between access devices arranged in a mesh network architecture.

Referring now to FIG. 5, active tag transmit control process 500 represents processing that might be performed by a wireless access device. Process 500 assumes that the wireless access device is currently operating in the transmit mode (task 502). In connection with operation in the transmit mode, the wireless access device will periodically transmit (broadcast) a suitably configured enable message or keep-alive beacon intended for the active RF tags in the system environment (task 504). This particular embodiment regulates the transmission of enable messages by powering the wireless access device on or off. Accordingly, if the wireless access device is powered off (query task 506), then it will stop transmitting its enable messages (task 508) until it is again powered on. As mentioned above with reference to FIG. 4, the lack of enable messages will cause the active RF tags to disable RF transmissions. If the wireless access device is subsequently powered on (query task 510), then process 500 may return to task 502 to again operate the wireless access device in the transmit mode.

In certain embodiments, the wireless access device might be able to change its operating mode while remaining powered on. If process 500 does not detect a change from the transmit mode (query task 512), then it may check whether it is time to transmit the next enable message (query task 514). If query task 514 determines that it is time to transmit another enable message, then process 500 returns to task 504. If not, then process 500 returns to query task 506. Thus, the loop defined by tasks 504, 506, 512, and 514 functions to periodically transmit enable messages at their designated times, unless the wireless access device is powered off or its mode is changed (query task 512).

If query task 512 detects a change from the transmit mode to the standby mode, then the wireless access device will be operated in the standby mode (task 516). While in the standby mode, the wireless access device will stop transmitting the enable messages. From the perspective of the active RF tags, this action is equivalent to powering down the wireless access device. In other words, the lack of enable messages will cause the active RF tags to disable RF transmissions. In an aviation application, the wireless access device can be powered off or placed into the standby mode during takeoff, landing, the entire flight, portions of the flight, or during other periods as appropriate.

While in the standby mode, if the operating mode is changed back to the transmit mode (query task 518), then process 500 returns to task 502 and reverts back to the transmit mode. If the wireless access device is powered off (query task 520) while in the standby mode, then process 500 may lead to task 508 (and continue as described above). In an aviation application, the wireless access device can be powered back on or switched back to the transmit mode after landing, during certain portions of the flight, or during other periods as appropriate. Notably, process 500 preferably executes in a manner that is independent of the active RF tags, and in a manner that does not depend on upstream RF signals transmitted by the active RF tags. If the active RF tags are configured as described herein to react to the presence and lack of enable messages (keep-alive beacons), then process 500 can manage the RF transmissions of the active RF tags by shutting down and turning on the wireless access devices in the system.

Referring now to FIG. 6, active tag operation process 600 represents processing that might be independently performed by active RF tags within the wireless system. Process 600 assumes that the active RF tag is currently operating in the transmit mode (task 602). In connection with operation in the transmit mode, the active RF tag enables or permits wireless RF transmissions by its RF module (task 604). Accordingly, although not separately shown in FIG. 6, the active RF tag can chirp or send any number of RF signals as long as the transmit mode is active. This embodiment assumes that the active RF tag expects to receive keep-alive beacons in designated time slots, where the keep-alive beacons originate from at least one wireless access device in the wireless system environment. Accordingly, process 600 may check whether the active RF tag has received a keep-alive beacon in the next designated time slot (query task 606). If so, then process 600 can return to task 602 and the active RF tag can continue operating in the transmit mode.

If, however, a keep-alive beacon is not received in its expected time slot, then process 600 may increment a beacon or time slot counter (task 608). Task 608 functions to keep track of how many consecutive keep-alive beacons have been missed by the active RF tag. For purposes of this description, the count may be initialized at a value of zero (although any initial value may be used). If the current count exceeds a maximum count value (query task 610), then the active RF tag switches modes and is operated in the standby mode (task 612). If the current count does not exceed the maximum count value, then process 600 returns to query task 606 to monitor for the next keep-alive beacon. Thus, the loop defined by tasks 606, 608, and 610 detects a configurable mode switching condition, and the loop causes the active RF tag to switch to the standby mode if the active RF tag fails to receive keep-alive beacons in a predetermined consecutive number of designated time slots. In certain embodiments, the maximum count value can be set to zero such that the active RF tag will switch to the standby mode if it fails to receive a keep-alive beacon in any designated time slot. As another example, if the maximum count value is set to two, then the active RF tag will not switch to the standby mode unless it fails to receive keep-alive beacons for three consecutive time slots.

In connection with operating the active RF tag in the standby mode, process 600 disables or prevents RF transmissions by the active RF tag (task 614). To accomplish this, the active RF tag may perform one or more actions. For example, it may activate a switch to remove a supply voltage from the transmitter of the RF module (while leaving the receiver operational), or it may activate a switch such that the RF module receives no feed signals. As explained above with reference to FIG. 4, RF transmissions by the active RF tag will cease until the active RF tag receives another keep-alive beacon. While in the standby mode, if the active RF tag does not receive a keep-alive beacon (query task 616), then process 600 returns to task 612. The loop defined by tasks 612, 614, and 616 corresponds to a time period during which the active RF tag remains in the standby mode. If, however, the active RF tag subsequently receives a keep-alive beacon, then process 600 can return to task 602. As a result, the active RF tag switches back to the transmit mode.

Figure 7:
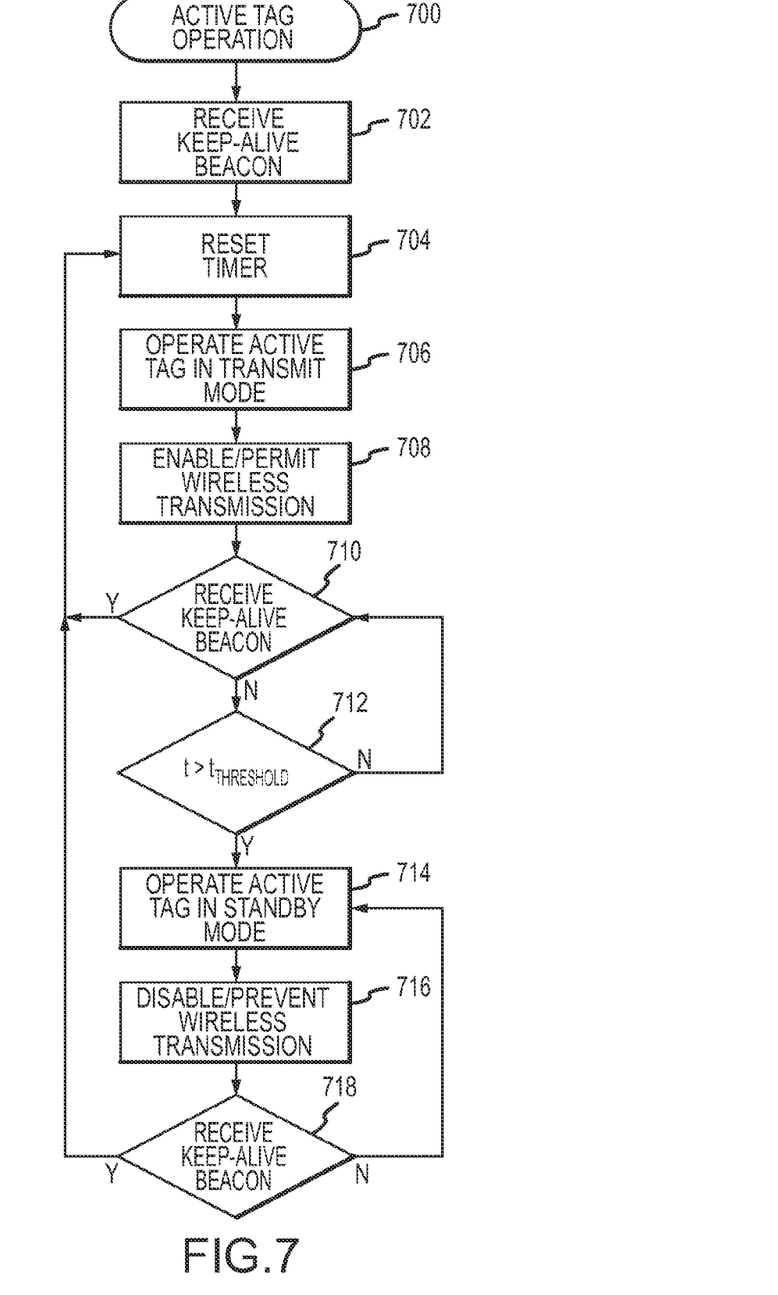
FIG. 7 is a flow chart that illustrates an alternate embodiment of an active tag operation process.

FIG. 7 is a flow chart that illustrates an alternate embodiment of an active tag operation process 700, which might be independently performed by active RF tags within the wireless system. Some aspects of process 700 are similar or identical to certain aspects of process 600, and common aspects will not be redundantly described in detail here in the context of process 700. Process 700 assumes that the active RF tag has already received a keep-alive beacon (task 702). In response to this keep-alive beacon, the active RF tag may initialize, initiate, or reset its timer (task 704). As explained above for RF device 300 (see FIG. 3), a timer can be used to measure a time interval between consecutive keep-alive beacons. Thus, task 704 responds to the newly received keep-alive beacon and resets the timer to a reference value, such as zero seconds.

The keep-alive beacon causes process 700 to operate the active RF tag in the transmit mode (task 706) such that wireless transmissions are enabled and permitted (task 708). This embodiment measures a time interval from the last received keep-alive beacon and activates the standby mode if the time interval exceeds a predetermined length. Accordingly, process 700 may check whether the active RF tag has received another keep-alive beacon (query task 710). If so, then process 700 can return to task 704 and the active RF tag can continue operating in the transmit mode.

If, however, another keep-alive beacon is not received, then process 700 compares the accumulated time interval to a threshold value (query task 712). In practice, the threshold time can be fixed, configurable, or dynamically adjusted to an appropriate value for the particular deployment of the system. If the accumulated time interval has not yet exceeded the threshold value, then process 700 returns to query task 710. If the accumulated time interval exceeds the threshold value, then the active RF tag switches modes and is operated in the standby mode (task 714). Thus, the loop defined by tasks 710 and 712 serves as a time monitor associated with two successive keep-alive beacons. In other words, process 700 will continue monitoring for the next keep-alive beacon until the threshold time has lapsed. If the next keep-alive beacon is received before the threshold time lapses, then the timer is reset in task 704. Otherwise, a mode switching condition is detected, and process 700 causes the active RF tag to switch to the standby mode.

In connection with operating the active RF tag in the standby mode, process 700 disables or prevents RF transmissions by the active RF tag (task 716) until the active RF tag receives another keep-alive beacon. While in the standby mode, if the active RF tag does not receive a keep-alive beacon (query task 718), then process 700 returns to task 714. If, however, the active RF tag subsequently receives another keep-alive beacon, then process 700 can return to task 704. As a result, the active RF tag switches back to the transmit mode.

The active RF tags, wireless access devices, and methodologies described herein can be deployed to provide an asset tracking, locationing, or presence detection system for the aviation industry, where strict regulations and rules may prohibit or limit the amount of RF transmissions during takeoff, flight, and landing of aircraft, or prohibit or limit the amount of RF transmissions until the aircraft reaches a designated altitude. The technique described herein causes active RF tags in the system to enter a standby mode (where RF transmissions are disabled) in response to the powering down of the wireless access devices in the system. Alternatively or additionally, a configurable setting or interface can be used to cause the active RF tags to enter the standby mode (without actually powering down the wireless access devices). The wireless system uses keep-alive beacons generated by the wireless access devices to maintain the normal transmit mode, and the absence or lack of keep-alive beacons to maintain the standby mode.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing transmissions in a wireless system having a wireless device and at least one wireless access device, the method comprising:
   the wireless device receiving keep-alive beacons during a first period of time;
   operating the wireless device in a transmit mode during the first period of time;
   measuring, during the first period of time, a time interval initiated in response to receiving a last keep-alive beacon;
   comparing the time interval to a threshold value;
   switching the wireless device to a standby mode if the time interval exceeds the threshold value;
   the wireless device receiving no keep-alive beacons during a second period of time that follows the first period of time; and
   operating the wireless device in a standby mode during the second period of time.

2. The method of claim 1, wherein operating the wireless device in the standby mode comprises preventing transmissions by the wireless device.

3. The method of claim 1, wherein the keep-alive beacons originate from the at least one wireless access device.

4. The method of claim 1, wherein during the first period of time the wireless device receives keep-alive beacons in designated time slots.

5. The method of claim 4, further comprising switching to the standby mode if the wireless device fails to receive a keep-alive beacon in a designated time slot.

6. The method of claim 4, further comprising switching to the standby mode if the wireless device fails to receive keep-alive beacons in a predetermined consecutive number of designated time slots.

7. The method of claim 1, further comprising:
   the wireless device receiving keep-alive beacons during a third period of time that follows the second period of time; and
   operating the wireless device in the transmit mode during the third period of time.

8. A wireless data communication system comprising:
   one or more wireless access devices, each configured to transmit keep-alive beacons to support operation of the wireless data communication system in a transmit mode; and
   a radio frequency (RF) device configured to support operation of the wireless data communication system in the transmit mode for as long as it receives keep-alive beacons from any of the one or more wireless access devices, and to support operation of the wireless data communication system in a standby mode if it no longer receives any keep-alive beacons, wherein the RF device is configured to:
   measure, while operating in the transmit mode, a time interval initiated in response to receiving a last keep-alive beacon;
   compare the time interval to a threshold value;
   switch to the standby mode if the time interval exceeds the threshold value; and
   disable its wireless transmissions while operating in the standby mode.

9. The system of claim 8, wherein the one or more wireless access devices are onboard aircraft devices.

10. The system of claim 9, further comprising an aircraft control unit coupled to the one or more wireless access devices, and configured to initiate powering down of the one or more wireless access devices for the standby mode.

11. The system of claim 8, wherein the RF device is an active RF tag.

12. The system of claim 8, wherein the RF device is configured to:
   receive, while operating in the transmit mode, keep-alive beacons in designated time slots;
   switch to the standby mode if it fails to receive a keep-alive beacon in a designated time slot; and
   disable its wireless transmissions while operating in the standby mode.

* * * * *